(12) United States Patent
Lacombe et al.

(10) Patent No.: US 9,669,387 B2
(45) Date of Patent: Jun. 6, 2017

(54) METHOD FOR MANUFACTURING OF SPHEROIDAL ALUMINA PARTICLES

(71) Applicant: IFP ENERGIES NOUVELLES, Rueil-Malmaison (FR)

(72) Inventors: Sylvie Lacombe, Vernaison (FR); Priscilla Avenier, Grenoble (FR); Malika Boualleg, Villeurbanne (FR); Delphine Bazer-Bachi, Irigny (FR); Patrick Euzen, Paris (FR); Joseph Lopez, Saint Julien les Rosiers (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 99 days.

(21) Appl. No.: 14/365,781

(22) PCT Filed: Nov. 16, 2012

(86) PCT No.: PCT/FR2012/000466
§ 371 (c)(1),
(2) Date: Jun. 16, 2014

(87) PCT Pub. No.: WO2013/093221
PCT Pub. Date: Jun. 27, 2013

(65) Prior Publication Data
US 2014/0357471 A1 Dec. 4, 2014

(30) Foreign Application Priority Data
Dec. 20, 2011 (FR) ...................................... 11 03998

(51) Int. Cl.
| | | |
|---|---|---|
| *C01F 7/00* | (2006.01) |
| *B01J 21/04* | (2006.01) |
| *C01F 7/02* | (2006.01) |
| *C01F 7/44* | (2006.01) |
| *B01J 35/10* | (2006.01) |
| *B01J 37/00* | (2006.01) |
| *C04B 35/111* | (2006.01) |
| *C04B 35/626* | (2006.01) |
| *B01J 27/135* | (2006.01) |

(52) U.S. Cl.
CPC ............. *B01J 21/04* (2013.01); *B01J 27/135* (2013.01); *B01J 35/108* (2013.01); *B01J 35/1019* (2013.01); *B01J 35/1042* (2013.01); *B01J 37/0072* (2013.01); *C01F 7/02* (2013.01); *C01F 7/447* (2013.01); *C04B 35/111* (2013.01); *C04B 35/6263* (2013.01); *C01P 2004/32* (2013.01); *C01P 2006/11* (2013.01); *C01P 2006/12* (2013.01); *C01P 2006/14* (2013.01); *C01P 2006/21* (2013.01); *C04B 2235/322* (2013.01); *C04B 2235/3218* (2013.01); *C04B 2235/5436* (2013.01); *C04B 2235/94* (2013.01)

(58) Field of Classification Search
CPC ...... C04B 35/111; C04B 35/6263; C01F 7/02; C01F 7/447; B01J 27/135; B01J 21/04; B01J 35/1019; B01J 35/1042
USPC ... 502/8, 439, 332, 302–304, 227, 229, 230, 502/349, 353–355, 325–327; 252/373; 585/899; 423/625, 628
See application file for complete search history.

(56) References Cited

U.S. PATENT DOCUMENTS

| | | |
|---|---|---|
| 3,464,928 A | 9/1969 | Mathies |
| 4,179,408 A | 12/1979 | Sanchez et al. |
| 4,273,735 A | 6/1981 | Jacques et al. |
| 4,279,779 A | 7/1981 | Sanchez et al. |
| 4,542,113 A | 9/1985 | Meyer et al. |
| 6,635,598 B2 * | 10/2003 | Dongara .............. B01J 23/8966 502/224 |
| 2011/0206919 A1 | 8/2011 | Nagai et al. |

FOREIGN PATENT DOCUMENTS

| | | |
|---|---|---|
| CN | 102765737 | * 11/2012 |
| EP | 0001023 A1 | 3/1979 |
| EP | 0090994 A2 | 10/1983 |
| EP | 2361885 A1 | 8/2011 |
| FR | 1503495 A | 11/1967 |
| GB | 119589 | 7/1968 |
| GB | 1119589 A | 5/1969 |
| GB | 2189780 A | 11/1987 |

OTHER PUBLICATIONS

International Search Report from PCT/FR2012/000466 dated Nov. 6, 2013.

* cited by examiner

*Primary Examiner* — Steven Bos
(74) *Attorney, Agent, or Firm* — Millen, White, Zelano and Branigan, P.C.

(57) ABSTRACT

The present invention concerns spheroidal alumina particles, catalysts comprising such particles as a support and a process for the production of spheroidal alumina particles, comprising the following steps:

a) preparing a suspension comprising water, an acid and at least one boehmite powder for which the ratio of the crystallite dimensions in the [020] and [120] directions obtained using the Scherrer X-ray diffraction formula is in the range 0.7 to 1;
b) adding a pore-forming agent, a surfactant and optionally water, or an emulsion comprising at least one pore-forming agent, a surfactant and water to the suspension of step a);
c) mixing the suspension obtained in step b);
d) shaping the spheroidal particles by the oil-drop method using the suspension obtained in step c);
e) drying the particles obtained in step d);
f) calcining the particles obtained in step e).

15 Claims, 1 Drawing Sheet

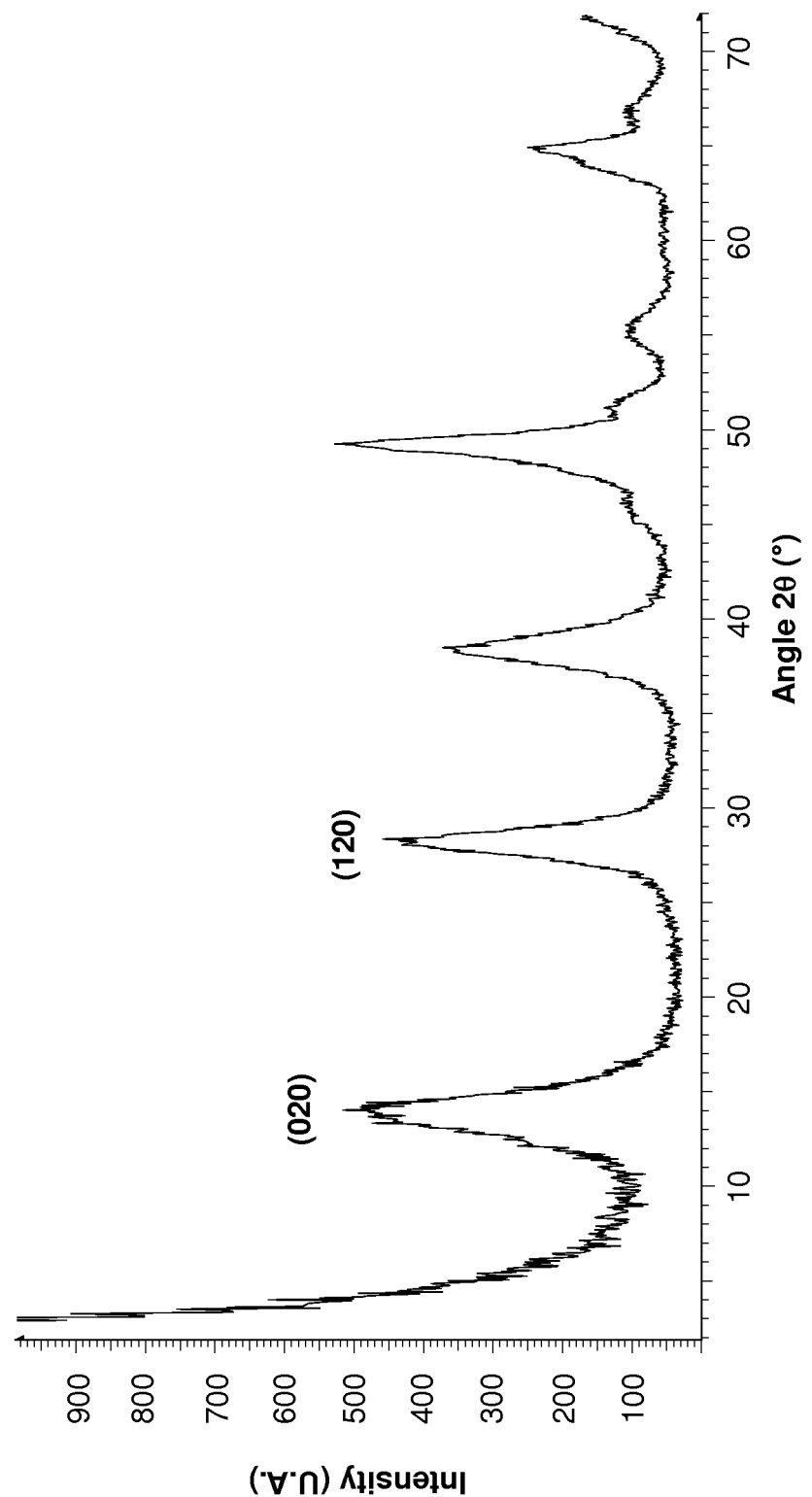

METHOD FOR MANUFACTURING OF SPHEROIDAL ALUMINA PARTICLES

FIELD OF THE INVENTION

The invention relates to a process for the production of spheroidal alumina particles. The invention also relates to spheroidal alumina particles obtained using the process of the invention.

Finally, the invention relates to catalysts comprising such particles as a support and to the use of such catalysts in catalytic processes for the treatment of hydrocarbons, in particular in catalytic reforming processes.

PRIOR ART

The spheroidal alumina particles used as a porous support for catalysis are well known to the skilled person.

As an example, document U.S. Pat. No. 2,422,499 describes a process for the production of such particles using a process known as the "oil-drop" process.

The principle of that technique consists of preparing an aqueous alumina sol and of dropping the alumina sol in fine droplets through a nozzle into a column comprising an upper phase which is not miscible with water, and a lower aqueous phase. The particles are thus shaped during passage through the water-immiscible phase and subsequent coagulation occurs in the aqueous phase. Once recovered, the particles are washed, dried and calcined.

Particularly important parameters which have to be controlled during the synthesis of spheroidal particles of this type include the density and the pore volume, since they affect the final use of such particles.

Document FR 1 503 495 discloses that, in order to reduce the density of the particles, it is possible to add pore-forming agents to the alumina sol. During the formation of the particles, such pore-forming agents, which are then eliminated during the calcining step, create a macroporosity in the particle. This macroporosity has the effect of increasing the pore volume and thus of reducing the density of the particle.

However, such a macroporosity has a negative impact on the mechanical strength of low density supports.

The mechanical strength (in particular the crush strength and wear resistance) is a vital parameter which has to be considered having regard to the envisaged application of the alumina particle in catalysis. In fact, when being used, for example in a moving bed, the alumina particles are subjected to shocks and to frictional phenomena which could cause the formation of fines which run the risk of blocking the units or filters and which also contribute to the loss of a portion of the catalyst charged into the catalytic reactor.

Thus, it is clearly important to be able to manufacture alumina particles which have two opposing characteristics, namely a low density and good mechanical strength.

BRIEF DESCRIPTION OF THE DRAWING

FIG. 1—Represents a diffractogram of a boehmite obtained with a copper target, identifying the diffraction peaks of the (020) and (120) planes.

SUMMARY OF THE INVENTION

Thus, in one aspect the invention provides a process for the production of spheroidal alumina particles with a low density (for example a settled packing density of about 0.5 g/mL to 0.6 g/mL) and with a mechanical strength which is satisfactory for use in catalytic reactors.

In accordance with the invention, the process for the production of spheroidal alumina particles comprises the following steps:
 a) preparing a suspension comprising water, an acid and at least one boehmite powder for which the ratio of the crystallite dimensions in the [020] and [120] directions obtained using the Scherrer X-ray diffraction formula is in the range 0.7 to 1;
 b) adding a pore-forming agent, a surfactant and optionally water, or an emulsion comprising at least one pore-forming agent, a surfactant and water to the suspension of step a);
 c) mixing the suspension obtained in step b);
 d) shaping the spheroidal particles by the oil-drop method using the suspension obtained in step c);
 e) drying the particles obtained in step d);
 f) calcining the particles obtained in step e).

The Applicant has surprisingly observed that it is possible to form low density particles with a mechanical strength at least equivalent to a dense alumina support (for example a settled packing density of approximately 0.6 g/mL to 0.7 g/mL), while limiting the quantity of pore-forming agent used in the process, provided that at least a portion of the boehmite powder employed has a crystallographic structure as defined above. Thus, by means of the process of the invention, it is possible to limit the formation of macropores at the origin of the reduction in the mechanical strength and, in contrast, to favour the formation of mesopores at the origin of the useful porosity for use of the material as a catalyst support.

Furthermore, by limiting the quantity of pore-forming agent employed, the process of the invention has an additional, economic advantage, in particular by reducing the costs of starting materials and of treating volatile organic compounds originating from the decomposition of the pore-forming agent which are released during the calcining step.

Preferably, the aqueous boehmite suspension further comprises an alumina charge or alumina precursor. This charge may be selected from the group formed by hydrargillite, bayerite, amorphous gels, and aluminas known as transition aluminas comprising at least one rho, chi, eta, gamma, kappa, theta, delta or alpha phase. The alumina charge may be in the form of a powder or particles of alumina obtained by grinding and screening shaped alumina bodies; after grinding, these particles have a median diameter of 50 µm or less, preferably less than 30 µm and more preferably less than 20 µm. The term "median diameter" denotes the D50, i.e. the diameter of an equivalent sphere for which 50% of the particles by volume have a larger diameter and 50% have a smaller diameter.

The pore-forming agent which is particularly suitable for the process is an oil cut with a boiling point in the range 220° C. to 350° C. which will be degraded during the calcining step.

In accordance with one embodiment, elements termed "promoters" are also incorporated during the formation of said particles. To this end, a soluble salt of one or more elements selected from groups IIIA, IVA, VA and the lanthanides in the periodic classification of the elements is added to the aqueous suspension of boehmite powder.

Preferably, the step for shaping the particles comprises the following steps:
 a) transferring the suspension to a dropping pot equipped with nozzles the orifices of which are calibrated to form droplets;

b) dropping the suspension under gravity in a column containing an organic phase in the upper portion and a basic aqueous phase in the lower portion in order to harvest the spheroidal particles at the bottom of the basic aqueous phase.

In accordance with the process of the invention, the step for drying the spheroidal particles is carried out at a temperature in the range 60° C. to 150° C., for example for 0.5 to 20 hours.

The step for calcining the spheroidal particles is carried out at a temperature in the range 450° C. to 900° C., preferably in the range 550° C. to 800° C., for 0.5 to 12 hours, preferably in the range 1 to 8 hours, more preferably in the range 1 to 5 hours.

Thus, after calcining, it is possible to form spheroidal particles which generally have a mean diameter in the range 1.2 to 3 mm, a BET specific surface area in the range 150 to 300 m$^2$/g, and an average crush strength (ACS) of at least 2.5 daN, preferably at least 3.0 daN.

The value for the ACS is obtained using a standard test (ASTM standard D4179-01), which consists of subjecting a material in the form of a millimetric object, such as a bead in the case of the present invention, to a compressive force, generating rupture. This test is thus a measurement of the tensile strength of the material. The analysis is repeated over a certain number of solids taken individually, and typically over a number of solids in the range 10 to 200. The mean of the lateral rupture forces measured constitutes the mean ACS, which is expressed in force units (N) in the case of spheroidal particles.

After calcining, the spheroidal particles generally have:
  a nitrogen adsorption isotherm volume (which we shall define as $V_{meso}$), which is representative of the mesoporous volume (pore diameter in the range 2 to 50 nm), which is in the range 0.65 to 0.85 mL/g; and
  a volume of pores with a diameter of less than 7 μm (which we shall define as $V_{meso+macro}$), measured by mercury porosimetry, which is in the range 0.65 to 0.85 mL/g; and
  for which the ratio $Q=[(V_{meso+macro}-V_{meso})/(V_{meso+macro})]$ is less than 10%, preferably less than 8%, more preferably less than 5%. The ratio Q thus expresses the volume of the macropores with respect to the sum of the meso- and macropore volumes.

Thus in the context of the present invention, the term "mesoporous volume" designates the volume constituted by pores with a diameter in the range 2 to 50 nm, while the term "macroporous volume" designates the volume occupied by pores with a diameter in the range 50 nm to 7 μm.

The nitrogen adsorption isotherm is measured in accordance with ASTM standard D3663-03. The pore volume known as $V_{meso}$ is taken as the volume of nitrogen measured during the adsorption step and corresponds to a relative pressure $P/P_s$ (pressure measurement over saturated vapour pressure) equal to 0.99. The pore volume is measured by mercury porosimetry in accordance with ASTM standard D4284-03.

After calcining, the spheroidal particles of the invention generally have a settled packing density (SPD) in the range 0.5 to 0.6 g/mL. The SPD measurement consists of introducing the beads into a specimen the volume of which has already been determined then, by vibration, of packing them until a constant volume is obtained. The apparent density of the settled product is calculated by comparing the mass introduced and the volume occupied after settling. The uncertainty in the measurement is generally of the order of ±0.01 g/mL.

Thus, the invention further concerns spheroidal alumina particles which are capable of being obtained using the process of the invention and comprising a nitrogen adsorption isotherm volume, termed $V_{meso}$ which is representative of the mesoporous volume, which is in the range 0.65 to 0.85 mL/g and a volume of pores with a diameter of less than 7 μm, termed $V_{meso+macro}$, measured by mercury porosimetry, which is the range 0.65 to 0.85 mL/g and for which the ratio $Q=[(V_{meso+macro}-V_{meso})/(V_{meso+macro})]$ is less than 10%, said particles comprising a mean diameter in the range 1.2 to 3 mm, a BET specific surface area in the range 150 to 300 m$^2$/g and a settled packing density (SPD) in the range 0.5 to 0.6 g/mL.

The spheroidal alumina particles of the invention generally have an average crush strength (ACS) of at least 2.5 daN, preferably at least 3.0 daN.

The invention also concerns a catalyst comprising at least one or more metals selected from group VIII of the periodic classification of the elements, deposited on a support formed by spheroidal alumina particles in accordance with the present invention. The catalyst of the invention may optionally also include at least one promoter selected from the groups IIIA, IVA, VA of the periodic classification of the elements and the lanthanides. These promoter elements are present in the catalyst, after calcining, in an amount which is generally in the range 0.01% to 2% by weight of catalyst.

The catalyst of the invention may also preferably comprise a halogenated compound selected from the group constituted by fluorine, chlorine, bromine and iodine. The quantity of halogenated compound is generally in the range 0.1% to 8% by weight, preferably in the range 0.2% to 5% by weight of catalyst after calcining.

By way of example, a catalyst for use as a reforming catalyst for an oil cut may comprise platinum, tin (optionally other metals) and chlorine, deposited on a spheroidal alumina support obtained in accordance with the process of the present invention.

These catalysts are also useful in catalytic reforming reactions or reactions for the production of aromatics by bringing said catalyst into contact with a hydrocarbon feed. The catalytic reforming processes can be used to increase the octane number of gasoline fractions obtained from the distillation of crude oil and/or from other refining processes, such as catalytic cracking or thermal cracking.

Finally, these catalysts may be of application in steam reforming, cracking, hydrocracking, hydrogenation, dehydrogenation and dehydrocyclization of hydrocarbons or other organic compounds.

DETAILED DESCRIPTION OF PARTICULAR EMBODIMENTS

The operative mode for the preparation of spheroidal alumina particles in accordance with the invention thus comprises the following steps:
  a) preparing a suspension comprising water, an acid and at least one boehmite powder for which the ratio of the crystallite dimensions in the [020] and [120] directions obtained using the Scherrer X-ray diffraction formula is in the range 0.7 to 1;
  b) adding a pore-forming agent, a surfactant and optionally water, or an emulsion comprising at least one pore-forming agent, a surfactant and water to the suspension of step a);
  c) mixing the suspension obtained in step b);
  d) shaping the spheroidal particles by the oil-drop method using the suspension obtained in step c);

e) drying the particles obtained in step d);

f) calcining the particles obtained in step e).

Boehmite powders wherein the ratio of the crystallite dimensions in the [020] and [120] directions obtained using the Scherrer X-ray diffraction formula is in the range 0.7 to 1 are known.

In a variation, this boehmite powder may also be synthesized by alkalinisation of an aluminium nitrate solution using a sodium hydroxide solution, generally at ambient temperature and at a controlled pH, generally a pH of about 10. The suspension is then aged, for example for one week in an oven at 95° C. without stirring. The pH of the suspension after aging changes; the pH increases and the final pH is 11.5, for example. The solid is recovered by filtering and then is washed, for example in a volume of water approximately equal to the starting volume, then dried in a stream of air, generally at ambient temperature.

The boehmite powder thus obtained is composed of crystallites for which the ratio of crystallite dimensions in the [020] and [120] directions obtained using the Scherrer X-ray diffraction formula is in the range 0.7 to 1.

X-ray diffraction was carried out on the boehmites using the conventional powder method on a diffractometer.

The Scherrer formula is a formula used in X-ray diffraction on powders or polycrystalline samples which links the mid-height width of the diffraction peaks to the crystallite dimensions.

By way of example, FIG. 1 represents a diffractogram of a boehmite obtained with a copper target, identifying the diffraction peaks of the (020) and (120) planes used to determine the crystallite dimensions.

When an emulsion is prepared in step b), the emulsion is prepared by mixing the pore-forming agent, the surfactant and water, with stirring.

The quantity of pore-forming agent, expressed as the ratio of the mass of pore-forming agent to the total mass of water engaged in the suspension obtained in step b), is in the range 0.2% to 30%, preferably in the range 0.5% to 20%, more preferably in the range 0.5% to 10%, and particularly preferably in the range 0.5% to 8%. The pore-forming agent is a substance which is not completely miscible with water, which can be eliminated by combustion and is liquid at ambient temperature. It may be selected from mineral greases, oils and waxes, fats, hydrocarbons and oil cuts. As an example, the pore-forming agent is a paraffin cut containing 10 to 14 carbon atoms, formed from normal- and iso-paraffins, and having a boiling point in the range 220° C. to 350° C.

Particularly suitable surfactants are non-ionic surfactants or ionic surfactants, for example cationic surfactants, used alone or as a mixture. Preferably, non-ionic surfactants are used. The proportion of surfactant present in the emulsion is defined as being equal to the ratio of the mass of surfactant to the mass of pore-forming agent. This ratio is in the range 1% to 25% by weight, preferably in the range 1% to 15% by weight and more preferably in the range 3% to 10%.

The quantity of water in the emulsion represents 5% to 20% by weight of the total quantity of water corresponding to the mixture (boehmite suspension and emulsion).

The emulsion is prepared at a temperature in the range 15° C. to 60° C., preferably in the range 20° C. to 40° C.

It is also possible to add the pore-forming agent, the surfactant and optional water directly to the aqueous suspension containing the boehmite, i.e. without first forming an emulsion, either by adding them at the same time, or in successive steps. In this case, the same proportions of the various constituents described above are used.

The suspension is prepared by mixing, with vigorous stirring, an acidic aqueous solution into which one or more types of boehmite powder have been added. However, in accordance with the invention, at least one boehmite powder has a ratio of crystallite dimensions in the [020] and [120] directions obtained by the Scherrer formula using X-ray diffraction in the range 0.7 to 1. In the case in which a plurality of boehmite powders are used, the proportion of boehmite with a ratio of crystallite dimensions in the [020] and [120] directions obtained by the Scherrer formula using X-ray diffraction in the range 0.7 to 1 is at least 10% by weight with respect to the total quantity of boehmite powder, preferably at least 30% by weight and particularly preferably at least 50%.

During the preparation of the boehmite suspension, it is possible to add an alumina charge or alumina precursor. The quantity of charge employed, expressed as the % by weight of $Al_2O_3$, is less than or equal to 30% by weight with respect to the total equivalent weight of $Al_2O_3$ of the suspension. This charge may be selected from the group formed by hydragillite, bayerite, amorphous gels and aluminas known as transition aluminas comprising at least one rho, chi, eta, gamma, kappa, theta, delta or alpha phase. The alumina charge may be in the powder form or in the form of particles of alumina obtained by grinding and screening shaped alumina bodies; after grinding, these particles have a median diameter of 50 µm or less, preferably less than 30 µm, and still more preferably less than 20 µm. The term "median diameter" denotes the D50, i.e. the diameter of an equivalent sphere for which 50% of the particles by volume have a larger diameter and 50% have a smaller diameter.

Optionally, the suspension may comprise a salt of one or more elements selected from groups IIIA, IVA, VA and the lanthanides, which act as a promoter. These elements will thus be incorporated into the final spheroidal particles after drying and calcining. The proportion of the metallic salt or salts is calculated so that the quantity by weight of elements from groups IIIA, IVA, VA or lanthanides in the final product after calcining is in the range 0.01% to 2% by weight, preferably in the range 0.05% to 1% by weight.

The quantity of acid engaged in the suspension is such that the ratio of the mass of said acid with respect to the dry mass of the boehmite source or sources and the charge (if present in the suspension) is in the range 0.5% to 20%, preferably in the range 1% to 15%. By way of example, the acid aqueous solution is a solution of a strong mineral acid, such as $HNO_3$ or $H_2SO_4$.

The proportion of water engaged in the suspension is calculated so that the ratio with respect to the dry mass (corresponding to the mass of boehmite powder plus optional charge, expressed as $Al_2O_3$ equivalent) to the total mass of water of the mixture is in the range 10% to 50%, preferably in the range 15% to 40%.

After mixing the suspension and the emulsion or after adding the pore-forming agent, surfactant and optional water to the suspension, stirring of the solution obtained is maintained until the viscosity of said solution is in the range 200 to 700 MPa·s, preferably in the range 250 to 400 MPa·s. Thus, the solution has rheological properties which are suitable for the oil-drop method through the nozzles of the dropping pot.

One method which is particularly suitable for shaping is the oil-drop method. This method consists of passing the suspension obtained in step b), for example the (alumina suspension+emulsion) mixture, into a dropping pot constituted by nozzles with a calibrated orifice, so as to form droplets. The dropping pot is placed at the head of a column containing an upper organic phase and a lower phase constituted by a basic aqueous phase. The organic phase is selected such that it has a density which is slightly lower than that of water.

As the droplet passes through the organic phase, it is shaped into spheres, while gelling (or coagulation) occurs in the aqueous phase.

Surfactant or phase transfer agent type additives may be added to the aqueous phase to promote passage through the interface and the coagulation of the particles in the basic aqueous phase.

In the context of the invention, the non-miscible organic phase may be selected from mineral greases, oils and waxes, fats, hydrocarbons and oil cuts. Preferably, the organic phase is a paraffinic cut containing 10 to 14 carbon atoms, formed from normal- and iso-paraffins, and with a boiling point in the range 220° C. to 350° C.

The basic aqueous phase is, for example, an ammonia, ammonium carbonate, or amine solution. Preferably, the basic aqueous phase is an ammonia solution.

At the end of the step for forming the spheroidal particles, the beads are recovered and separated from the aqueous phase through a screen. It is also possible for the particles which have been formed to undergo one or more aging steps, as taught in application EP 001 023.

The beads are dried at a temperature in the range 60° C. to 150° C., in dry or moist air, generally for 0.5 to 20 hours. The drying protocol may optionally comprise one or more constant temperature stages. It may optionally require varying levels of humidity during drying, preferably between 40 and 1000 g of water per kg of dry air, more preferably between 100 and 1000 g of water per kg of dry air.

The beads are then calcined at a temperature in the range 450° C. to 900° C., preferably in the range 550° C. to 800° C. Calcining generally lasts from one to a few hours, preferably between 0.5 and 12 hours, more preferably between 1 and 8 hours, still more preferably between 1 and 5 hours. This calcining step may comprise one or more constant temperature stages.

EXAMPLES

X-ray diffraction on the boehmites of the examples presented below was carried out using the conventional powder method with the aid of a Brüker D5005 (CuKα1+2=0.15418 nm) diffactometer equipped with a diffracted beam curved graphite monochromator and a scintillation detector. The analyses of the solids were recorded in Debye-Scherrer mode from 3° to 80° (2θ) with a step of 0.02° for 8 seconds. The peaks corresponding to the diffraction planes (020) and (120) were then located at approximately 14.5° 2θ and 28° 2θ respectively.

The viscosity was measured using a cone-plane rheometer at a shear rate of 100 s$^{-1}$.

Example 1 (Comparative)

The support of Example 1 was prepared using a Pural SB3 type boehmite sold by Sasol the X-ray diffraction pattern of which exhibited a ratio of crystallite dimensions in the [020] and directions obtained by the Scherrer formula of 0.66.

A suspension containing 20% of mineral material (expressed as % $Al_2O_3$) was prepared by mixing a charge of γ alumina with a median diameter by volume, D50, of 50 μm and the Pural SB3 boehmite powder in an acidified aqueous solution containing 3.6% by weight of $HNO_3/Al_2O_3$.

The boehmite took the solid $Al_2O_3$ fraction to 88% by weight and the γ alumina charge to 12% by weight. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm$^3$. The surfactant was Galoryl, a commercial emulsification agent. These compounds were introduced in the following proportions: fraction by weight of pore-forming agent/water=9.4% and fraction by weight of surfactant/pore-forming agent=6%.

The system was stirred at 600 rpm until a suspension was obtained with rheological properties which were suitable for the oil-drop method (viscosity 250 MPa·s).

The oil-drop column was charged with an ammonia solution at a concentration of 28 g/L and an organic solution constituted by the same oil cut as that used as the pore-forming agent in the preparation of the emulsion (organic phase as the upper layer). The suspension was dropped using calibrated nozzles. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

Example 2

In Accordance with the Invention

A boehmite was synthesized by alkalinisation of a 0.1 mol/L aluminium nitrate solution using a 1 mol/L sodium hydroxide solution at ambient temperature and a pH set at about 10. The suspension was then aged for one week in an oven at 95° C. without stirring. The pH of the suspension changed after aging; the final pH was equal to 11.5. The solid was recovered by filtration, then washed in a volume of water approximately equal to the starting volume, then dried in a stream of air, at ambient temperature. The boehmite powder had an X-ray diffraction pattern wherein the ratio of the crystallite dimensions in the [020] and [120] directions obtained by the Scherrer formula was 0.79.

The support of Example 2 was prepared using the boehmite synthesized in this manner.

A suspension containing 20% of mineral material (expressed as the % $Al_2O_3$) was prepared by mixing a charge of γ alumina with a median diameter by volume, D50, of 50 μm and the boehmite powder in an acidified aqueous solution containing 10% by weight of $HNO_3/Al_2O_3$.

The boehmite took the solid $Al_2O_3$ fraction to 88% by weight and the γ alumina charge to 12% by weight. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm$^3$. The surfactant was Galoryl. These compounds were introduced in the following proportions: fraction by weight of pore-forming agent/water=1.6% and fraction by weight of surfactant/pore-forming agent=6%.

The system was stirred at 600 rpm until a suspension was obtained with rheological properties which were suitable for the oil-drop method (viscosity 250 MPa·s).

The oil-drop column was charged with an ammonia solution at a concentration of 28 g/L and an organic solution constituted by the same oil cut as that used as the pore-forming agent in the preparation of the emulsion. The suspension was dropped using calibrated nozzles. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

Example 3

In Accordance with the Invention

A boehmite was synthesized by alkalinisation of a 0.1 mol/L aluminium nitrate solution using a 1 mol/L sodium hydroxide solution at ambient temperature and a pH set at about 10. The suspension was then aged for one week in an oven at 95° C. without stirring. The pH of the suspension changed after aging; the final pH was equal to 11.5. The solid was recovered by filtration then washed in a volume of water approximately equal to the starting volume. The solid was taken up into suspension in water and autoclaved at 150° C. for 4 h. The suspension was centrifuged then dried in a stream of air at ambient temperature.

The support of Example 3 was prepared using the boehmite synthesized in this manner, which had an X-ray diffraction pattern wherein the ratio of the crystallite dimensions in the [020] and [120] directions obtained by the Scherrer formula was 0.93.

A suspension containing 25% of mineral material (expressed as the % $Al_2O_3$) was prepared by mixing a charge of γ alumina with a median diameter by volume, D50, of 50 μm and the boehmite powder in an acidified aqueous solution containing 15% by weight of $HNO_3/Al_2O_3$.

The solid $Al_2O_3$ fraction contained 88% by weight of boehmite and 12% by weight of the γ alumina charge. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm$^3$. The surfactant was Galoryl. These compounds were introduced in the following proportions: fraction by weight of pore-forming agent/water=1.4% and fraction by weight of surfactant/pore-forming agent=6%.

The system was stirred at 600 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 600° C. for 3 hours. The diameter of the beads obtained was 1.9 mm.

Example 4

In Accordance with the Invention

A boehmite was synthesized by alkalinisation of a 0.1 mol/L aluminium nitrate solution using a 1 mol/L sodium hydroxide solution at ambient temperature and a pH set at about 10. The suspension was then aged for one week in an oven at 95° C. without stirring. The pH of the suspension changed after aging; the final pH was equal to 11.5. The solid was recovered by filtrationfiltering then washed in a volume of water approximately equal to the starting volume. The solid was taken up in suspension in water and autoclaved at 180° C. for 24 h. The suspension was centrifuged then dried in a stream of air at ambient temperature. The boehmite powder had an X-ray diffraction patterndiagram wherein the ratio of the crystallite dimensions in the [020] and [120] directions obtained by the Scherrer formula was 0.91.

The support of Example 4 was prepared using the synthesized boehmite.

A suspension containing 25% of mineral material (expressed as the % $Al_2O_3$) was prepared by mixing the boehmite powder in an acidified aqueous solution containing 18% by weight of $HNO_3/Al_2O_3$.

This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm$^3$. The surfactant was Galoryl. These compounds were introduced in the following proportions: fraction by weight of pore-forming agent/water=1.1% and fraction by weight of surfactant/pore-forming agent=6%.

The system was stirred at 600 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 550° C. for 3 hours. The diameter of the beads obtained was 1.9 mm.

Example 5

In Accordance with the Invention

The support of Example 5 was prepared using a source of boehmite comprising 30% by weight of Pural SB3 and 70% by weight of boehmite synthesized in accordance with Example 2.

A suspension containing 20% of mineral material (expressed as the % $Al_2O_3$) was prepared by mixing a charge of γ alumina with a median diameter by volume, D50, of 50 μm and the source of boehmite in an acidified aqueous solution containing 12% by weight of $HNO_3/Al_2O_3$.

The boehmite took the solid $Al_2O_3$ fraction to 88% by weight and the γ alumina charge to 12% by weight. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm$^3$. The surfactant was Galoryl. These compounds were introduced in the following proportions: fraction by weight of pore-forming agent/water=3% and fraction by weight of surfactant/pore-forming agent=6%.

The system was stirred at 600 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

Example 6

In Accordance with the Invention

The support of Example 6 was prepared using the boehmite synthesized in Example 2.

A suspension containing 30% of mineral material (expressed as the % $Al_2O_3$) was prepared by mixing a charge of γ alumina with a median diameter by volume, D50, of 15 μm and the source of boehmite of Example 2 in an acidified aqueous solution containing 20% by weight of $HNO_3$/$Al_2O_3$.

The solid $Al_2O_3$ fraction contained 80% by weight of boehmite and 20% by weight of the γ alumina charge. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm³. The surfactant was Galoryl. These compounds were introduced in the following proportions: fraction by weight of pore-forming agent/water=1.6% and fraction by weight of surfactant/pore-forming agent=6%.

The system was stirred at 600 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

Example 7

In Accordance with the Invention

The support of Example 7 was prepared using the boehmite synthesized in Example 2.

A suspension containing 15% of mineral material (expressed as the % $Al_2O_3$) was prepared by mixing a charge of γ alumina with a median diameter by volume, D50, of 15 μm and the boehmite of Example 2 in an acidified aqueous solution containing 7% by weight of $HNO_3$/$Al_2O_3$. A quantity of $SnCl_2$ sufficient to obtain a support with a percentage by weight of Sn (promoter agent) of 0.3% after calcining was incorporated into this suspension.

The boehmite took the solid $Al_2O_3$ fraction to 88% by weight and the γ alumina charge to 12% by weight. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm³. The surfactant was Galoryl. These compounds were introduced in the following proportions: fraction by weight of pore-forming agent/water=1.6% and fraction by weight of surfactant/pore-forming agent=6%.

The system was stirred at 600 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

Example 8

In Accordance with the Invention

The support of Example 8 was prepared using the boehmite synthesized in Example 2.

A suspension containing 17% of mineral material (expressed as the % $Al_2O_3$) was prepared by mixing a charge of γ alumina with a median diameter by volume, D50, of 10 μm and the boehmite of Example 2 in an acidified aqueous solution containing 6% by weight of $HNO_3$/$Al_2O_3$. Quantities of $SnCl_2$ and $In(NO_3)_3$ sufficient to obtain a support with percentages by weight of Sn and In of 0.3% and 0.2% respectively after calcining were incorporated into this suspension.

The boehmite took the solid $Al_2O_3$ fraction to 90% by weight and the γ alumina charge to 10% by weight. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm³. The surfactant was Galoryl. These compounds were introduced in the following proportions: fraction by weight of pore-forming agent/water=1.6% and fraction by weight of surfactant/pore-forming agent=6%.

The system was stirred at 600 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

Example 9

In Accordance with the Invention

The support of Example 9 was prepared using the boehmite synthesized in Example 2.

A suspension containing 30% of mineral material (expressed as the % $Al_2O_3$) was prepared by mixing a charge of γ alumina with a median diameter by volume, D50, of 10 μm and the boehmite of Example 2 in an acidified aqueous solution containing 7% by weight of $HNO_3$/$Al_2O_3$. Quantities of $SnCl_2$ and $Ce(NO_3)_3$ sufficient to obtain a support with percentages by weight of Sn and Ce (promoter agents) of 0.3% and 0.05% respectively after calcining were incorporated into this suspension.

The boehmite took the solid $Al_2O_3$ fraction to 80% by weight and the γ alumina charge to 20% by weight. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm³. The surfactant was Galoryl. These compounds were introduced in the following proportions: fraction by weight of pore-forming agent/water=1.6% and fraction by weight of surfactant/pore-forming agent=6%.

The system was stirred at 600 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

Example 10

In Accordance with the Invention

The support of Example 10 was prepared using the boehmite synthesized in Example 2.

A suspension containing 20% of mineral material (expressed as the % $Al_2O_3$) was prepared by mixing a charge of γ alumina with a median diameter by volume, D50, of 10 μm and the boehmite of Example 2 in an acidified aqueous solution containing 3.5% by weight of $HNO_3/Al_2O_3$. Quantities of $SnCl_2$ and $H_3PO_4$ sufficient to obtain a support with percentages by weight of Sn and P of 0.3% and 0.4% respectively after calcining were incorporated into this suspension.

The boehmite took the solid $Al_2O_3$ fraction to 80% by weight and the γ alumina charge to 20% by weight. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm³. The surfactant was Galoryl. These compounds were introduced in the following proportions: fraction by weight of pore-forming agent/water=1.6% and fraction by weight of surfactant/pore-forming agent=6%.

The system was stirred at 600 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

Example 11

In Accordance with the Invention

A boehmite was synthesized by alkalinisation of a 0.1 mol/L aluminium nitrate solution using a 1 mol/L sodium hydroxide solution at ambient temperature and a pH set at about 10. The suspension was then aged for one week in an oven at 95° C. without stirring. The pH of the suspension changed after aging; the final pH was equal to 11.5. The solid was recovered by filtration then washed in a volume of water approximately equal to the starting volume, then dried in a stream of air at ambient temperature. The boehmite powder had an X-ray diffraction pattern wherein the ratio of the crystallite dimensions in the [020] and [120] directions obtained by the Scherrer formula was 0.79.

The support of Example 11 was prepared using the boehmite synthesized in this manner.

A suspension containing 20% of mineral material (expressed as the % $Al_2O_3$) was prepared by mixing a charge of γ alumina with a median diameter by volume D50=50 μm and the boehmite powder in an acidified aqueous solution containing 10% by weight of $HNO_3/Al_2O_3$.

The boehmite took the solid $Al_2O_3$ fraction to 88% by weight and the γ alumina charge to 12% by weight. The system was stirred at 400 rpm.

An emulsion containing a pore-forming agent, a surfactant and water was added to the above suspension after one hour. The pore-forming agent was an organic phase comprising a mixture of paraffins containing 10 to 12 carbon atoms with a boiling point of approximately 290° C. and a density of 0.75 g/cm³. The surfactant was Galoryl. These compounds were introduced in the following proportions: fraction by weight of pore-forming agent/water=1.6% and fraction by weight of surfactant/pore-forming agent=6%.

The (suspension+emulsion) system was stirred at 200 rpm until a suspension was obtained with rheological properties which were suitable for the oil-drop method (viscosity 250 MPa·s).

Shaping by the oil-drop method was carried out in accordance with Example 1. The beads were recovered from the bottom of the column and placed in a ventilated oven at 120° C. in moist air containing 200 g water/kg of dry air for 12 h. They were then calcined in dry air at 650° C. for 3 hours. The diameter of the beads obtained was 1.9 mm.

The particles obtained from the above examples were analysed using a variety of techniques. In particular, their BET specific surface area was measured, the ACS value (average crush strength) was measured using the ASTM D4179-88a method, and finally their pore volume was determined using the $N_2$ adsorption isotherm and their mercury adsorption volume. The nitrogen adsorption isotherms were produced and the mercury porosimetry was carried out in respective accordance with standards D3663-03 and D4284-03 cited in the patent.

The nitrogen adsorption isotherm was produced on a Micromeritics ASAP 2420 instrument, and the mercury intrusion was carried out on an Autopore 9500 instrument from Micromeritics.

The results of the measurements mentioned above are shown in Table 1.

TABLE 1

| Example | V meso (mL/g) | V meso + macro (mL/g) | Ratio, Q = [($V_{meso+macro}$ − $V_{meso}$)/($V_{meso+macro}$)] * 100 | ACS (daN) | BET Surface area (m²/g) | Settled packing density (g/mL) |
|---|---|---|---|---|---|---|
| 1 (comparative) | 0.64 | 0.74 | 14.2 | 2.2 | 207 | 0.55 |
| 2 (in accordance with the invention) | 0.69 | 0.71 | 2.8 | 4.0 | 191 | 0.59 |
| 3 (in accordance with the invention) | 0.72 | 0.73 | 1.4 | 4.5 | 187 | 0.56 |
| 4 (in accordance with the invention) | 0.75 | 0.77 | 2.6 | 5.6 | 185 | 0.54 |
| 5 (in accordance with the invention) | 0.68 | 0.72 | 5.5 | 3.9 | 195 | 0.58 |
| 6 (in accordance with the invention) | 0.69 | 0.71 | 2.8 | 4.5 | 193 | 0.59 |

TABLE 1-continued

| Example | V meso (mL/g) | V meso + macro (mL/g) | Ratio, Q = [($V_{meso+macro}$ − $V_{meso}$)/($V_{meso+macro}$)] * 100 | ACS (daN) | BET Surface area (m²/g) | Settled packing density (g/mL) |
|---|---|---|---|---|---|---|
| 7 (in accordance with the invention) | 0.69 | 0.71 | 2.8 | 5.0 | 190 | 0.60 |
| 8 (in accordance with the invention) | 0.70 | 0.72 | 2.8 | 5.3 | 192 | 0.59 |
| 9 (in accordance with the invention) | 0.69 | 0.71 | 2.8 | 4.9 | 192 | 0.58 |
| 10 (in accordance with the invention) | 0.69 | 0.70 | 1.4 | 4.9 | 190 | 0.59 |
| 11 (in accordance with the invention) | 0.69 | 0.70 | 1.4 | 4 | 197 | 0.59 |

The spheroidal alumina particles of the invention thus have an improved crush strength. Thus, the value for the ACS is at least 3.9 daN (Example 5) and even reaches 5.6 daN (Example 4), as opposed to 2.2 daN for the comparative example. This improvement can be explained by a relative reduction in the macroporous pore volume. In fact, the macroporous volume represents approximately 14% of the total pore volume for the comparative example, while for the examples of the invention, this percentage is between 1.4% and 5.5%. Finally, it should be noted that these technical effects have been obtained along with a reduction in the quantity of pore-forming agent employed during synthesis of the particles.

The invention claimed is:

1. Spheroidal alumina particles comprising a nitrogen adsorption isotherm volume, termed $V_{meso}$, which is representative of the mesoporous volume, which is in the range 0.65 to 0.85 mL/g and a volume of pores with a diameter of less than 7 μm, termed $V_{meso+macro}$, measured by mercury porosimetry, which is in the range 0.65 to 0.85 mL/g and for which the ratio Q=[($V_{meso+macro}$−$V_{meso}$)/($V_{meso+macro}$)] is less than 10%, said particles comprising a mean diameter in the range 1.2 to 3 mm, a BET specific surface area in the range 150 to 300 m²/g and a settled packing density in the range 0.5 to 0.6 g/mL.

2. Spheroidal alumina particles according to claim 1, in which the average crush strength is at least 2.5 daN.

3. A catalyst comprising a support formed from particles according to claim 1 and one or more metals of group VIII of the periodic classification of elements.

4. The catalyst according to claim 3, further comprising one or more elements of groups IIIA, IVA, VA of the periodic classification of elements or the lanthanides.

5. The catalyst according to claim 3, further comprising an element selected from the group consisting of fluorine, chlorine, bromine and iodine.

6. The catalyst according to claim 5, comprising platinum, tin and chlorine.

7. A process for the production of the spheroidal alumina particles of claim 1 comprising:
   a) preparing an aqueous suspension comprising water, an acid and at least one boehmite powder for which the ratio of the crystallite dimensions in the [020] and [120] directions obtained using the Scherrer X-ray diffraction formula is in the range 0.7 to 1;
   b) adding a pore-forming agent, a surfactant and optionally water, or an emulsion comprising at least one pore-forming agent, a surfactant and water to the suspension of step a) to obtain a suspension;
   c) mixing the suspension obtained in step b) to obtain a suspension;
   d) obtaining spheroidal particles by the oil-drop method of the suspension obtained in step c);
   e) drying of the spheroidal particles obtained in step d) to produce dried particles;
   f) calcining the dried particles.

8. The process according to claim 7, in which the aqueous suspension of step a) further comprises an alumina charge or alumina precursor constituted by particles having a median diameter by volume of 50 μm or less.

9. The process according to claim 8, in which the alumina charge is selected from the group consisting of hydragillite, bayerite, amorphous gels and transition aluminas comprising at least one rho, chi, eta, gamma, kappa, theta, delta or alpha phase.

10. The process according to claim 8, in which the weight ratio of the alumina charge to the total weight of $Al_2O_3$ of the suspension is 30% or less.

11. The process according to claim 7, in which the pore-forming agent is an oil cut having a boiling point in the range 220° C. to 350° C.

12. The process according to claim 7, in which the quantity of pore-forming agent, expressed as the ratio of the pore-forming agent to the total mass of water engaged in the suspension obtained in step b), is in the range 0.5% to 8%.

13. The process according to claim 7, in which the suspension in a) further comprises a salt of one or more elements of groups IIIA, IVA, VA of the periodic classification of elements or the lanthanides of the periodic classification of the elements.

14. The process according to claim 7, in which step d) obtaining for spheroidal particles comprises:
   i) transferring the suspension obtained in b) to a dropping pot equipped with nozzles having orifices calibrated to form droplets;
   ii) dropping the suspension under gravity in a column containing an organic phase which is immiscible with water in an upper portion and a basic aqueous phase in a lower portion in order to harvest the spheroidal particles at an outlet from the basic aqueous phase.

15. A transformation reaction process that is catalytic reforming, steam reforming, cracking, hydrocracking, hydrogenation, dehydrogenation or dehydrocyclization of hydrocarbons or organic compounds, comprising performing said transformation reaction process by subjecting a feed to a catalyst according to claim 3.

* * * * *